United States Patent [19]

Myers

[11] Patent Number: 5,435,883
[45] Date of Patent: Jul. 25, 1995

[54] HEAT APPLIED TRANSFER PRESS

[75] Inventor: David A. Myers, Connellsville, Pa.

[73] Assignee: Stahls', Inc., St. Clair Shores, Mich.

[21] Appl. No.: 141,800

[22] Filed: Oct. 22, 1993

Related U.S. Application Data

[63] Continuation-in-part of Ser. No. 679,337, Apr. 2, 1991, Pat. No. D. 340,730, and a continuation-in-part of Ser. No. 816,881, Dec. 30, 1991, Pat. No. 5,252,171.

[51] Int. Cl.⁶ .............................................. B30B 15/04
[52] U.S. Cl. ...................... 156/583.9; 156/583.91; 156/580; 156/583.1; 100/50
[58] Field of Search ............... 156/358, 359, 583.9, 156/583.91, 580, 581, 583.1, 583.2; 100/50, 43 P, 51, 52; 38/16; 101/27

[56] References Cited

U.S. PATENT DOCUMENTS

| | | | |
|---|---|---|---|
| D. 250,340 | 11/1978 | Douglas | D18/2 |
| D. 340,730 | 10/1993 | Myers | D15/146 |
| 2,624,389 | 1/1953 | Bungay | . |
| 2,644,151 | 6/1953 | Krueger | 340/227 |
| 3,035,510 | 5/1962 | Carpenter et al. | 100/93 |
| 3,450,031 | 6/1969 | Peterson | 100/93 |
| 3,454,741 | 7/1969 | Stewart | 219/243 |
| 3,567,560 | 3/1971 | Stiff | 156/583 |
| 3,823,054 | 7/1974 | Balzer et al. | 156/530 |
| 3,878,015 | 4/1975 | Johnston | 156/222 |
| 3,923,590 | 12/1975 | Humphries | 156/580 |
| 3,925,139 | 12/1975 | Simmons | 156/358 |
| 3,979,248 | 9/1976 | Kussmaul | 156/358 |
| 3,982,418 | 9/1976 | Leavesley et al. | 73/11 |
| 4,004,503 | 1/1977 | Dwyer | 101/9 |
| 4,055,456 | 10/1977 | Carnegie, Jr. | 156/366 |
| 4,058,055 | 11/1977 | Douglas | 156/583.9 |
| 4,172,750 | 10/1979 | Giulie | 156/267 |
| 4,190,485 | 2/1980 | Takeda et al. | 156/583.9 |
| 4,243,470 | 1/1981 | Higashigochi | 156/583.9 |
| 4,378,266 | 3/1983 | Gerken | 156/359 |
| 4,379,018 | 4/1983 | Griesdorn | 156/359 |
| 4,386,993 | 6/1983 | Matsuo | 156/382 |
| 4,421,589 | 12/1983 | Armini et al. | 156/382 |
| 4,469,545 | 9/1984 | Löw | 156/359 |
| 4,713,047 | 12/1987 | Klinkel | 493/34 |
| 5,167,750 | 12/1992 | Myers | 156/583.9 |
| 5,252,171 | 10/1993 | Anderosn et al. | 156/358 |

FOREIGN PATENT DOCUMENTS 2170443 1/1986 United Kingdom .
9009276 8/1990 WIPO .

Primary Examiner—Robert A. Dawson
Assistant Examiner—David Reifsnyder
Attorney, Agent, or Firm—Brooks & Kushman

[57] ABSTRACT

A heat applied transfer press includes a support arm for displacing an upper platen with respect to a lower platen mounted on a base. An operator controls movement of the support arm between open and closed positions and preferably includes an aligner for positioning the upper platen substantially parallel to the lower platen as the upper platen approaches the closed position. Preferably, the press also includes an adjuster for varying the distance between the upper and lower platen in the closed position. Preferably, an overcenter locking mechanism retains the press platens in the closed position, while springs resiliently urge the upper platen upwardly to its open position when the handle has been raised to retract the lever mechanism from its overcenter position.

10 Claims, 4 Drawing Sheets

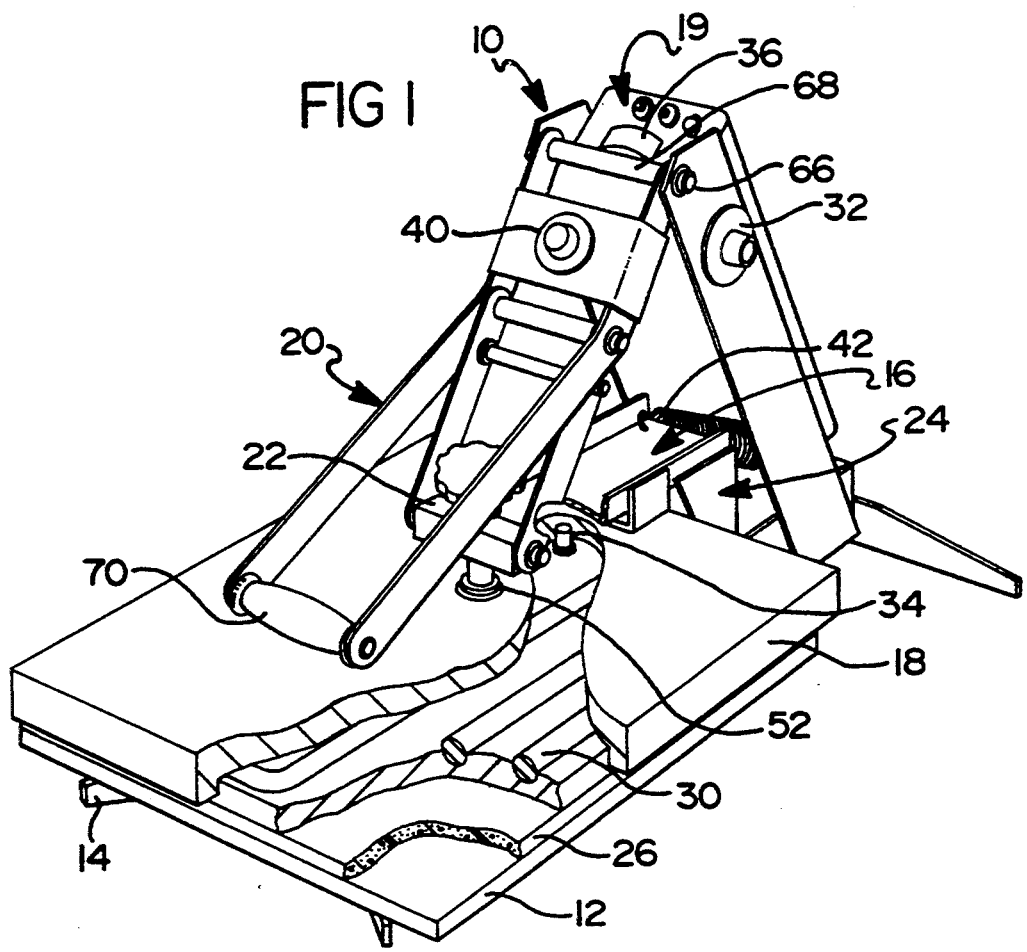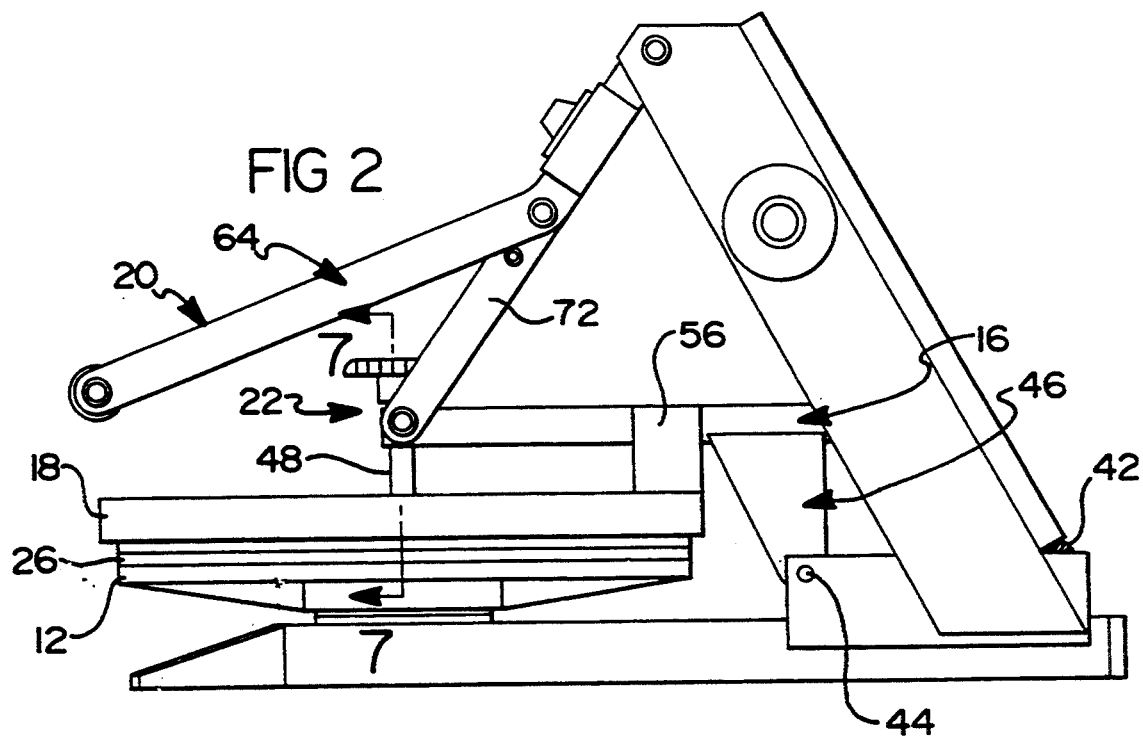

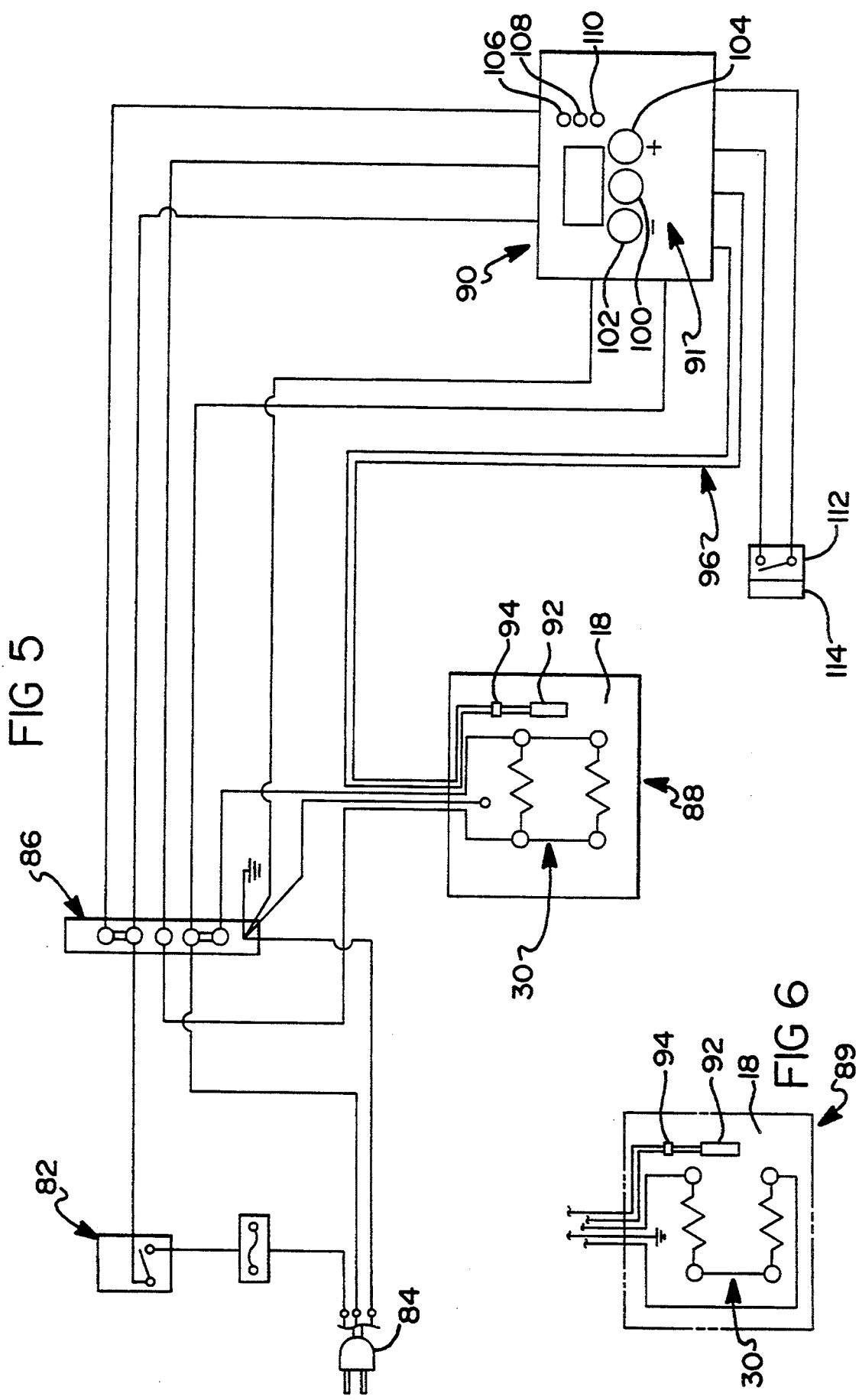

HEAT APPLIED TRANSFER PRESS

This application is a continuation-in-part of U.S. patent application Ser. No. 07/679,337, now U.S. Pat. No. D. 340,730, filed Apr. 2, 1991, and a continuation-in-part of U.S. patent application Ser. No. 07/816,881, filed Dec. 30, 1991 now U.S. Pat. No. 5,252,171.

BACKGROUND OF THE INVENTION

1. Field of the Invention

The present invention relates generally to press machinery and more particularly to such apparatus for manually applying heat applied transfers with manually displaced platens.

2. Description of the Prior Art

Lettering and logos for apparel such as shirts and jackets are often made as heat applied transfers. Such transfers bond to the apparel by releasing an adhering agent such as ink or adhesive which lock the heat applied transfer to the apparel fibers. Highly developed chemistries are employed to improve the quality and consistency of heat applied transfers, but such transfers often require precise operating conditions of temperature, pressure and time in order to properly apply the heat applied transfers and avoid incomplete, faded or obliterated transfer displays.

One of the problems of previously known apparatus is that thickness of the material used in apparel may differ substantially. In addition, the thickness of the lettering applied to the apparel may also vary through a wide range. However, some previously known presses for applying heat applied transfers are not adjustable for accommodating different thicknesses of materials and transfers.

One of the primary problems that contributes to distorted transfers and that complicates handling a change in thicknesses between transfers and materials is that pivoting movement of one platen toward the other platen causes a pinching effect at the end of the platens nearest the pivot point. Such pinching of the material laid between the platens before or during transfer application can deform a transfer or interfere with its proper position on the material. Another problem with the previously known pivot mechanisms for the platens is that nonuniform pressure may be exerted across the surface areas of the press platens. For example, a pressure gradient with substantially greater pressure between the platens at the ends nearest the pivot point may cause bleeding of the colors in the transfers and the material at that end, even where proper pressure is applied at the later-closing end spaced apart from the pivot point.

In addition, many of the previously known pivot mechanisms for displacing the press platens together did not provide adjustment of pressure which may be very important to enabling transfers to be applied to different types or thicknesses of material. Furthermore, the pressure between the platens was often inconsistent, particularly to the extent that external pads were laid between the platen and the apparel to be decorated in order to adjust the spacing between the platens in the closed position. As a result, the previously known apparatus provided inconsistent results with the transfers designed for application at predetermined temperatures and pressures.

SUMMARY OF THE PRESENT INVENTION

The present invention overcomes the abovementioned disadvantages by providing a press for heat applied transfers with platens that align substantially in parallel as an upper platen is displaced toward a closed position above the lower platen. In addition, the present invention provides an adjuster that controls the spacing between the upper and lower platens in the closed position. As a result, the upper platen may be positioned in its closed position over the lower platen so that the heat applied transfer does not deform or become mispositioned with respect to the apparel material laid in the press during operation of the press. Moreover, improved results can be obtained on a wide variety of apparel materials since thick as well as thin materials can be engaged with the proper pressure between the upper and lower platens.

Accordingly, the present invention provides an advantageous heat applied transfer press with a support arm pivotally coupled to a base and carrying an upper platen over a lower platen for displacement between an open position and a closed position closely adjacent to and in registration with the lower platen. An operator is positioned for manipulation by a worker to manually displace the support arm to and between the opened and closed positions, and an adjuster carried by the support arm varies the distance between the upper and lower platens in the closed position. It is also an advantage of the present invention to employ an aligner for aligning the upper platen in parallel with the lower platen as the upper platen approaches the closed position. Accordingly, as pressure becomes applied in the closed position, the pressure across the platens' mating surface is substantially consistent. Preferably, it is also an advantage of the present invention to form the aligner with a lever section raising the support arm above the pivot axis for the arm. In addition, it is preferably an advantage of the present invention to construct the adjuster as part of the aligner, and preferably, to include a support rod, a carrier engaging the support rod and supporting it on an end of the support arm, and a connector securing the upper platen to the support rod. Moreover, preferably the support rod is adjustably supported in a bore extending through the support arm.

BRIEF DESCRIPTION OF THE DRAWING

The present invention will be better understood by reference to the following detailed description of a preferred embodiment when read in conjunction with accompanying drawing in which like reference characters refer to like parts throughout the views and in which:

FIG. 1 is a perspective view of a heat applied transfer press according to the present invention with portions broken away for the sake of clarity;

FIG. 2 is a side elevational view of the apparatus shown in FIG. 1 with the platens shown in the closed position;

FIG. 5 is a schematic representation of a modified control circuit for the mechanical press construction of the present invention including a control face panel;

FIG. 6 is a schematic view showing a modified heating circuit for the control circuit shown in FIG. 5;

DETAILED DESCRIPTION OF THE PREFERRED EMBODIMENT

Figure 3:
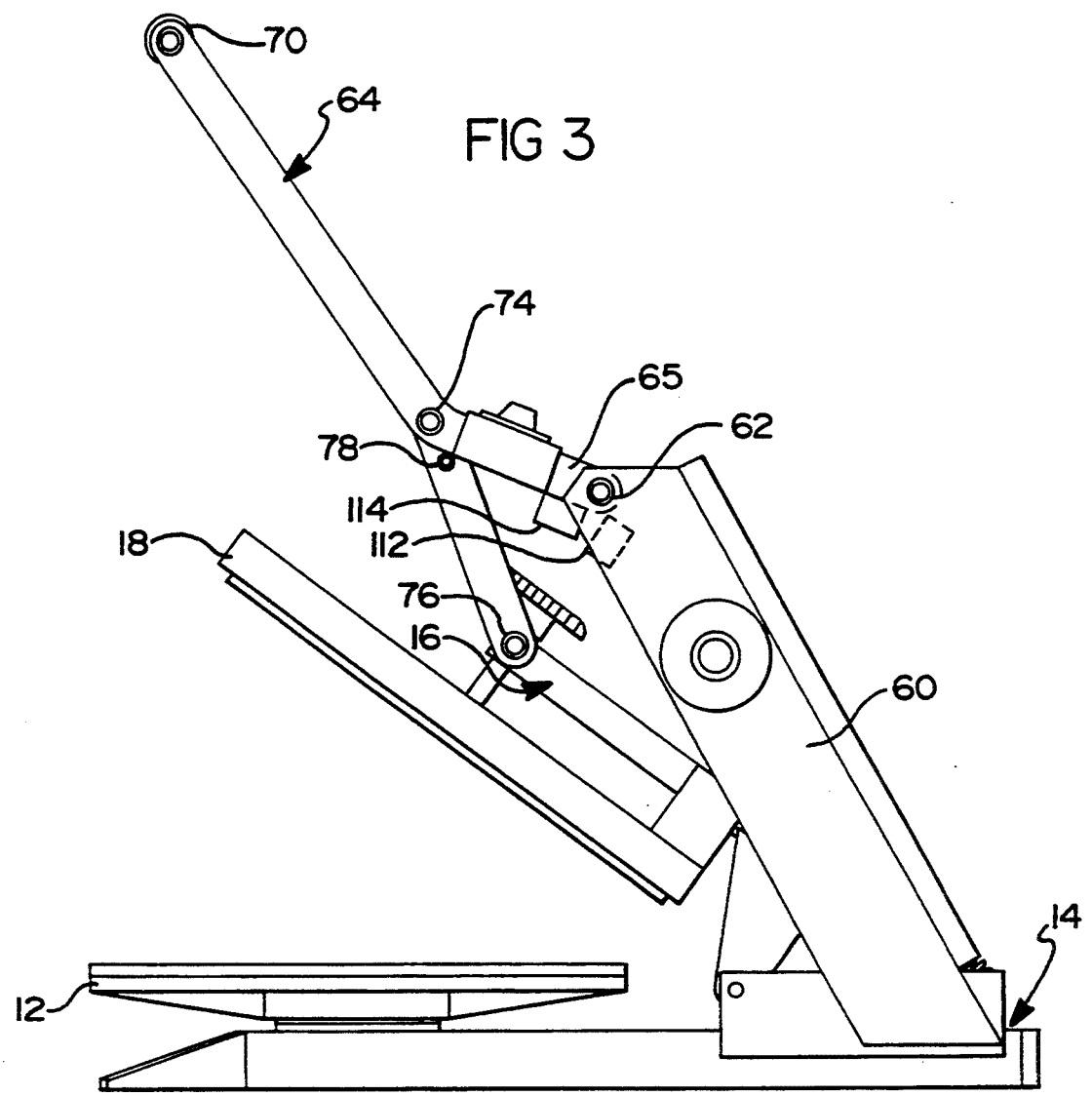
FIG. 3 is a side elevational view similar to FIG. 2 but showing the platens in an open position.

Referring first to FIG. 1, the heat applied transfer press 10 is there shown comprising a lower platen 12 mounted on a base 14. A support arm 16 is pivotally secured to the base 14 to support an upper platen 18 in a manner to be described in greater detail hereinafter. Nevertheless, in summary, the mechanism for displacing the platens comprises an operator 20 accessible to a press worker for manually displacing the upper platen 18 via a pivot mechanism between open and closed positions with respect to the platen 12. Pivot mechanism preferably includes an aligner 24 for aligning this upper platen substantially in parallel to the lower platen as the upper platen approaches the closed position. In addition, an adjuster controls the spacing between the facing platen surfaces in the closed position. Accordingly, the press 10 may include platen pads such as the insulating pad 26 for accommodating surface irregularities occurring on the apparel or on the heat applied transfers to be inserted between the platens 18 and 12 for application to the apparel.

As also shown in FIG. 1, at least one platen, and preferably the upper platen 18 includes a heating element 30 such as conventional resistive heating elements which may be formed as serpentine or otherwise wound throughout the surface area of the platen 18 which is coupled to a typical power supply through a thermostat or other switch 32 for adjusting the temperature of the heating element 30. In addition, the upper platen 18 carries a thermo-couple sensor 34 which is wired in a conventional manner to generate a visual display 36. The display is mounted for exposure to the area occupied by a worker positioned for manipulating and controlling the operator 20. The electrical circuit for the heating elements 30 includes a temperature control such as the thermostat 32 shown in FIG. 1. In addition, a timer control 40 provides a perceptible indication to the worker manipulating the operator 20. Although a simple mechanical spring type timer may be used, it also possible to provide an automatic timing system utilizing an automatic proximity sensor and digital display counter as described in greater detail hereinafter.

As also shown in FIG. 1, the support arm 16 includes an opening receiving the curved ends of a pair of springs 42. The other ends of the springs are similarly constructed to engage in openings in the base 14. For example, a hook pin 43 (FIG. 8) secured on the back of the base 14 may interlock with the curved ends of the spring 42. A support arm 16 pivots about a first pivot axis 44 by pivotally securing one end of a lever section 46 about the axis, and the other end of the lever section 46 to the support arm 16 as best shown in FIG. 2.

As also shown in FIG. 2, the adjuster 22 comprises a threaded aperture in the arm 16 adapted to receive a correspondingly threaded rod 48 so that the rod extends through a carrier such as a boxed end 50 of arm 16. The threaded engagement permits adjustment of the longitudinal length of the rod 48 extending through the support arm 16, but securely holds the rod with respect to the arm 16. The lower end of the rod 48 is coupled to the platen 18 by a connector, for example a swivel connector 52 (FIG. 1) that permits a floating platen support to equalize pressure across the facing platen surfaces despite disparity in the thickness of transfers and apparel portions positioned between the platens. The upper end of the rod 48 includes a grip for adjusting the position of the rod 48 within the threaded aperture in the boxed end 50. It is also within the scope of the present invention to construct the adjuster 22 in any known adjustable manner for its purpose, for example, extending a rod 48 through a throughbore while maintaining the rod in a fixed position by a set screw extending radially into intersection with the throughbore. Thus, while the rod 48 in the preferred embodiment is threaded in a correspondingly threaded aperture through a solid, box shaped end 50, an adjuster may be constructed as any means for adjusting the height of the platen 18, or adjusting the spacing between the upper and lower platens in the closed position.

Figure 7:
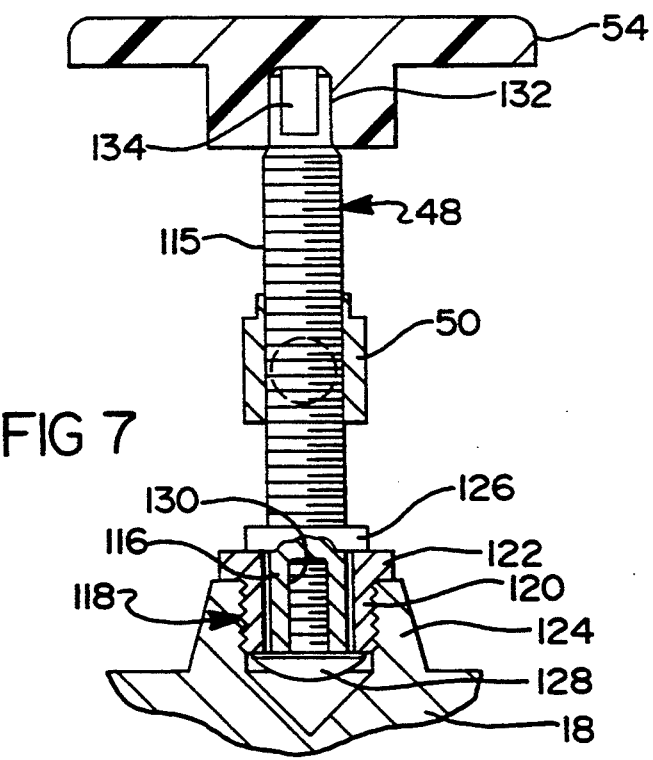
FIG. 7 is an enlarged sectional view taken substantially along the line 7—7 in FIG. 2.

In the preferred embodiment, the grip comprises a manual handle 54 in the form of a grippable knob locked for rotation with the rod 48 extending through the aperture in the arm 16. As best shown in FIG. 7, the rod 48 of the adjuster 22 is preferably formed as a spindle having a threaded portion 115 and an end portion 116 dimensioned to be received within an interior bore of an adjustment bushing 118. The bushing 118 include an annular, exteriorly threaded body 120 and a hexagonal head 122. The threaded body 120 is received in a correspondingly threaded bore of a boss 124 on the upper platen 18. An enlarged shoulder 126 extends radially outwardly from the spindle between the spindle end 116 and the threaded portion 48. The bore of the bushing 118 has a diameter slightly greater than the diameter of the spindle end 116 and includes a chamfered upper end adjacent the hex head 122. The resulting annular space between the spindle and the bushing permits swivel adjustment between the platen 18 threadedly engaged with the bushing 118 and the spindle end 116 of the rod 48. The bushing 118 is retained on the spindle 116 by means of a headed bolt 128 engaged in a correspondingly threaded bore 130 extending into the spindle end 116.

The other end of the rod 48 includes the stem 132 having a flatted side 134 adapted to be received in a correspondingly shaped bore in the handle grip 54. As a result, the upper platen 18 is relatively adjustable when transfers and apparel are inserted between the lower platen 12 and the upper platen 18 have disparity between or irregularity in thickness so as to exert substantially constant pressure to all of the components positioned between the platens. The alloy steel swivel bushing is coated to reduce wear and oxidation for example by, chrome or nickel plating, particularly to reduce oxidation at pressing temperatures and a stainless steel bolt is likewise treated for similar purposes.

Figure 4:
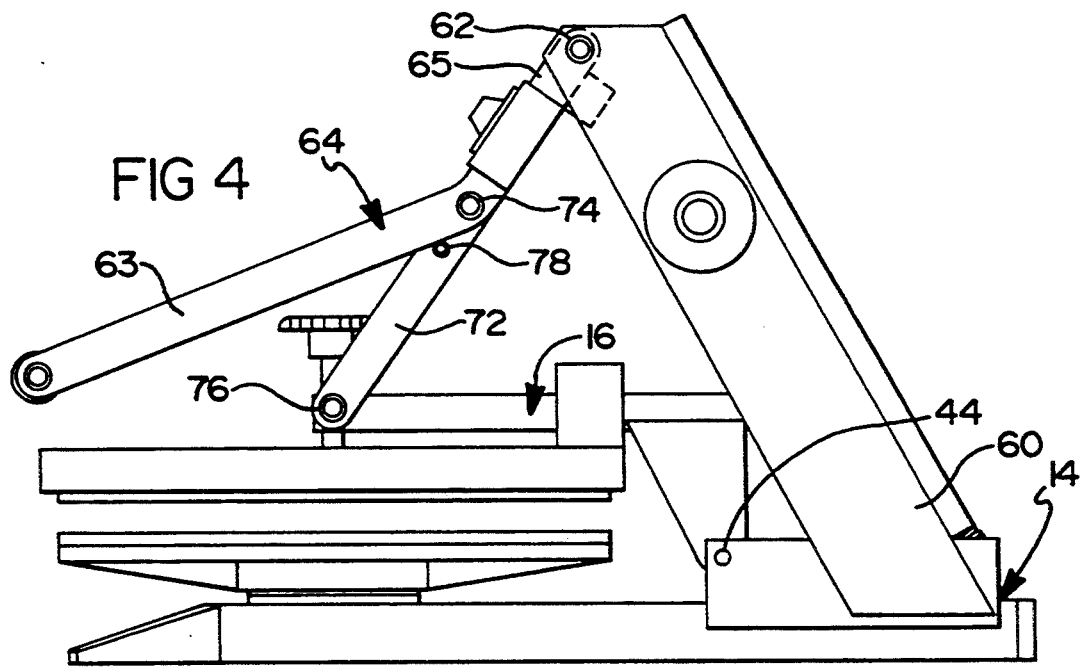
FIG. 4 is a side elevational view similar to FIG. 2 but showing a modified alignment of the platens in a closed position.

It is also within the scope of the present invention to include the adjuster 22 as part of the aligner 24 that serves to align the upper platen 18 substantially parallel to the lower platen 12 as the platen 18 approaches a closed position, as shown in FIGS. 2 and 4, from an open position as shown in FIG. 3. Proper registration of the surface areas of the platens is aided by guides as the springs 42 resiliently urge the support arm 16 toward the open position shown in FIG. 3. The guides of the preferred embodiment comprise a channel member 56 secured to the upper surface of the platen 18 to align the platen in proper registration over the platen 12, even during swiveling movement of the platen 18 about the swivel connector 52. The channel member 56 has a depth sufficient to receive the support arm 16 regardless of the extended length of the support rod 48.

Displacement of the upper platen 18 between the open and closed position is controlled by the operator 20. The operator 20 in the preferred embodiment comprises a lever mechanism supported from a stanchion 60 rigidly secured to the base 14. Preferably, the stanchion 60 is inclined toward the platens 12 and 18 in the direction of the area to be occupied by the worker manually controlling the operator 20 so that a second pivot axis 62 is supported by the stanchion 60 above and forwardly of the pivot axis 44, for example, as shown in FIG. 3. A lever arm 64, formed by spaced, parallel bars, is pivotally secured about the pivot axis 62. For example, a pivot bolt 66 (FIG. 1) extends through a spacer tube 68 (FIG. 1) secured between the spaced legs of the lever arm 64, and extends through the bars and stanchion sides. The legs of the lever arm 64 are joined at the other end by a handle 70 (FIG. 1) similarly bolted between the legs. A second lever arm 72, also constructed of a pair of spaced, parallel legs, is pivotally secured to the lever arm 64 about a third pivotal axis 74 intermediate the pivot axis 62 and the handle 70. The other end of second lever arm 72 is pivotally secured to the support arm 16 about a pivot axis 76.

As the handle 70 is raised to a position shown in FIG. 3, the lever arm 64 pulls the lever arm 72 and thus the support arm 16 to the raised position shown in the Figure. This displacement is assisted by the springs 42 as previously discussed to pivot the upper platen 18 about the pivot axis 44 to the position shown in FIG. 3. In this open position, the press 10 provides an enlarged area between the platens 12 and 18 for insertion and removal of apparel and the heat applied transfers as well as manual alignment of those items upon the lower platen 12 or any support pads 26, as previously discussed.

As the handle 70 is moved downwardly toward the platen 12, to a closed position as shown in FIGS. 2 and 4, the support arm 16 pivots toward the horizontal position shown in FIG. 4, whereby the upper platen 18 becomes aligned substantially parallel to the lower platen 12 as it approaches the closed position shown in FIG. 4. Moreover, as the platen reaches the closed position shown in FIG. 4, the pivot axis 74 reaches a position slightly beyond the centerline extending between pivot axes 62 and 76. In this position, the lever arm portion 65 and the lever 72 are aligned to urge the platen 18 downwardly at the swivel connection 52. The relative positions of the levers, the support arm 16 and stanchion 60 provide a more consistent and greater application of force than was possible with previously known press constructions.

The amount of overcenter displacement is limited by a stop member 78 protruding from the lever 72 so as to abut against a portion 63 of the lever arm 64. The portion 63 is angled with respect to the lever arm portion extending between the pivot axes 62 and 74 so that the handle 70 remains unobstructed for access by the worker. Thus, the handle is positioned above the platen 18 when the press is in its closed position. Moreover, the stop member 78 abuts against a lever arm portion 65 extending between the pivot axes 62 and 74, when the operator 20 has moved the platens to the open position shown in FIG. 3.

In any event, it will be understood that the present invention provides a heat applied transfer press in which an aligner positions the upper platen in a substantially parallel alignment with a lower platen 12 as it approaches a closed position. Moreover, the closed position can be varied by an adjuster 22 that raises the level of the upper platen 18 with respect to the lower platen 12. As a result, regardless of the thickness of the material or the transfers to be applied or the thickness of support pads to be used between the platens, the alignment of the platens avoids uneven pinching of the material and the transfers positioned between the upper and lower platens.

Preferably, a lever section 46 (FIG. 2) raises the support arm 16 above the pivot axis 44, and in cooperation with the adjustable rod 48, aligns the upper platen 18 in a desired manner. Moreover the channel bracket 56 on the upper platen 18 maintains registering position of the upper platen 18 with the lower platen 12. In addition, the swivel connector 52 enables the pressure between the platens to be consistently dispersed across the surfaces of the platens. Moreover, the pads 26 assist the pressure distribution regardless of irregularities in the thicknesses of the heat applied transfers and the apparel to which it is applied. Furthermore, the extended length of end 63 of the lever arm 64 provides substantial leverage for ease in manually operating the press to displace the platens 12 and 18 between the upper and lower positions, even during application and releasing of high pressure engagement between the platens.

Figure 8:
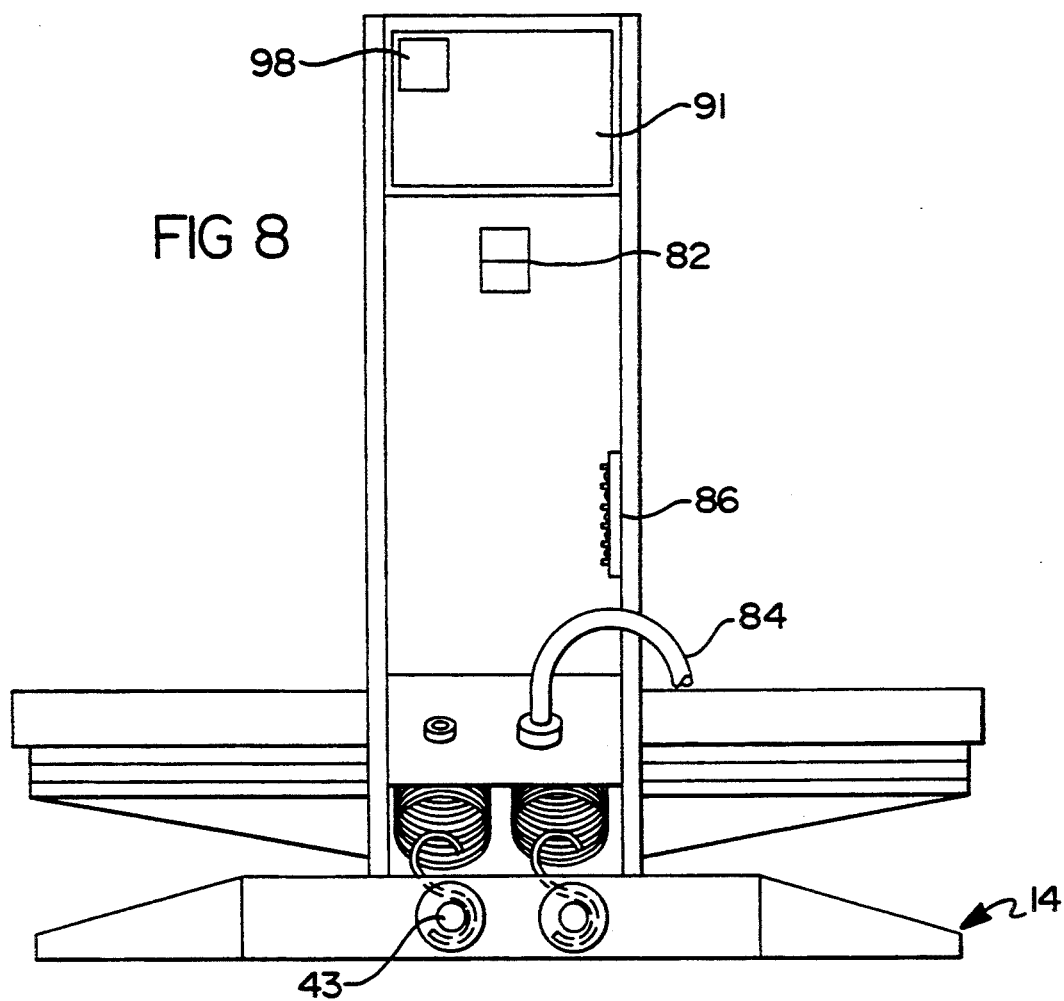
FIG. 8 is a rear elevational view of a press incorporating the modified control circuit of FIG. 5.

An improved control circuit 80 for controlling the heat and duration of press closure when operating the mechanical apparatus previously described is also provided by the invention as will be described in relation to FIG. 5. A control circuit 80 includes an on/off switch 82 for selectively coupling a power source, as diagrammatically represented by the electrical plug 84 in FIG. 5, with a control board 91 (FIG. 8) operating a temperature circuit 88 selectively controlled with the aid of a face panel 90. The face panel 90 replaces the power light operating and heater indication light, on/off switches and the analog needle indicator 36 on face panel 19. The switch 82 is coupled by conductors to the terminal strip 86 which is conveniently located, for example, on the back of frame member or stanchion 60 as shown in FIG. 8, to couple the power source 84 to the heating circuit 88 through the control panel 90. The control panel 90 and board 91 replaces the previous separated analog controls and monitors, such as the temperature control 32, the display 36, and bell timer 40 respectively, with a digital, microprocessor based control with an automatically resettable timer and a digital LED temperature display 136, in a manner which eases a worker's interface with the controls as will be described in greater detail.

A microprocessor based control on board 91 carries a microprocessor, for example an eight bit microprocessor such as a PIC 16C55 programmed to initiate and run the remaining circuit components. For example, the board 91 monitors the change of resistance in the resistance temperature detector (RTD), for example a platinum sensor as distributed by Gordon sheathed in stainless steel for direct insertion in a platen bore to be positioned closer to the heating surface and encased in a conventional thermal transfer compound. The RTD relays display information to the display in terms of a digital readout, for example, a degrees Farenheit reading readily identifiable to a worker. The board 91 consolidates the wide variety of electrical components, for example the buzzer 98 (FIG. 8) used as time elapsed indicator, as well as the power supply including a regulator and filtering required for operation of the microprocessor. Moreover, the analog inputs for example, the resistance temperature detector, is input to an amplifier and then converted in an analog to digital convertor to an appropriate input for the microprocessor in a well known manner. Similarly, the microprocessor works in a well known manner to control electrical operation of the press, for example, compare the change in resistance represented by the digital information received in response to the analog inputs along conductors 96 and generate a display signal sent to the display 136 on the control panel face 90.

Additional processing can be accomplished to improve the basic functions of temperature sensing and display, timing and elapsed period display and control of the electrical source signal to the heater elements. For example, the microprocessor preferably avoids repetitious switching on and off the current flow to the resistive element 30 by updating a predetermined set point as actual temperature variations occur. For example, the predetermined temperature set point set by the operator at the face panel 90 signals a predetermined value to be compared in a microprocessor with the actual temperature reading received from the resistive temperature detector 92. As the temperature actually shifts above the desired set temperature, the microprocessor automatically lowers the apparent set point for sake of comparison so that the processor identifies a lower, for example 349° set point, as the next set point at which an operational circuit change is required. Then once the RTD 92 detects an actual platen temperature of 349°, the microprocessor resets the set temperature to another predetermined value for example, 351°. Accordingly, the microprocessor control can therefore send current to the heating element 30 until the RTD 92 detects a temperature change consistent with the newly set desired temperature and recycles the set point to a previously set lower limit. As a result, the control avoids rapidly repeated successive switching of the power on and off to the heating element which can substantially shorten the life of the switch and interfere with other components.

Heating circuit 88 includes a heating element 30 in the form of two resistive elements electrically coupled in parallel for use with 120 volt AC mains current. In addition, resistance temperature detector (RTD) 92, secured to the platen 18 by a releasable Bake-lite coupling 94 for convenient removal of the RTD 92, is coupled by conductors 96 to the rear of control unit 90. An alternative embodiment of the heating circuit is shown at 89 in FIG. 6. In circuit 89, the heating element 30 includes a series connected pair of resistive elements adapted to be coupled to 240 volt AC mains circuit.

Referring again to FIG. 5, when the power switch 82 has been turned on, the control panel 90 initiates the press 10 in a standard operating mode at which the temperature is automatically set at 330° F. and the closure duration is automatically set at 8 seconds before an indicator, for example, an audible buzzer 98, is sounded. A mode selector, for example, depression of the button 100, enables the parameters of time and temperature to be set and permits a worker's selective return to a modified transfer operation. In particular, initial depression of the button 100 enables the temperature to be set. The user is provided with a corresponding visual indication of the temperature set mode by an illuminated set mode light 108, for example a yellow light, simultaneously with illumination of temperature light 106, for example, a red light. In this mode of operation, the control panel 90 enables the user to decrease the platen temperature by setting a decrease control, for example, depressing the button 102, or an increase control, for example, depression of button 104. The heating circuit 88 is disabled in this mode.

A subsequent actuation of the mode selector button 100 sets the control panel 90 to adjust the time duration before actuation of the indicator 98 after closure of the platens occurs while the machine is set in the operating mode. A corresponding illumination of the mode set indicator, such as light 108 and the time indicator, such as light 110 demonstrate that the LED signal at display 136 corresponds to the time being set in response to actuation of decreaser 102 and increaser button 104. Further actuation of the mode selector button 100 terminates the adjusting stage and sets the control board 91 for operation of the circuit 80 in accordance with the most recently set time and temperature parameters. Accordingly, all of the lights 106, 108, and 110 are turned off, in the operating mode until the machine is closed. At closing, the "time" light 110 is lit, and when count down is complete, the yellow LED 108 lites while the buzzer 98 sounds.

The desired combination of time, temperature and pressure at which heat applied transfer is properly accomplished is dependent upon the thickness of material, the type or composition of the adhesive or inks to be applied and the style and composition of the lettering material or the apparel. As a result, the control panel 90 of the preferred embodiment is set to adjust the temperature range of the platen 18 between 205° F. and 450° F. Accordingly, in the preferred embodiment, the sensor 92 detects temperature ranges within the range of 200° F. to 450° F. Nevertheless, it is to be understood that these ranges may be changed as necessary depending on the type of heat applied lettering and apparel to which the transfer is to be applied.

A closure sensor, for example, a reed switch 112 detects when the upper platen 18 has been closed against the lower platen 12. The switch closure initiates an input to the microprocessor for counting the duration previously set during the time adjustment mode of the control circuit as discussed above. For example, switch 112 may be carried by stanchion 60 as shown in FIG. 3 while magnet 114 is carried by the lever arm portion 65 to move into an adjacent position to close the reed switch 112 when the upper platen 18 is moved to its closed position. Separation of the magnet 114 from the switch 112 by lifting of the handle 70 terminates actuation of the buzzer 92 until another heating cycle has been completed.

Having thus described the present invention, many modifications will become apparent to those skilled in the art to which it pertains without departing from the scope and spirit of the present invention as defined in the appended claims.

What is claimed is:

1. A heat applied transfer press comprising:
   an upper platen;
   a lower platen and a base supporting the upper platen, at least one of said upper and lower platens having a heating element;
   a support arm pivotally coupled to the base about a first pivot axis and carrying the upper platen to and between an open position spaced apart from the lower platen and closed position closely adjacent the lower platen;

an operator for manually displacing said support arm to and between said open and closed positions;

an adjuster carried by said support arm for varying the closed position distance between said upper and lower platens; and wherein said operator comprises an overcenter lever mechanism comprising a handle, the handle pivotally mounted about a second axis parallel to said first pivot axis, and said overcenter mechanism extending between said second axis and said adjuster.

2. The invention as defined in claim 1 and further comprising an aligner for positioning said upper platen parallel to said lower platen as said upper platen approaches said closed position.

3. A heat applied transfer press comprising:
an upper platen;
a lower platen and a base supporting said lower platen;
a heating element carried by at least one of said upper and lower platens;
a support arm pivotally coupled to the base about a first pivot axis and carrying the upper platen to and between an open position spaced from the lower platen and a closed position closely adjacent the lower platen;
an operator for manually displacing the support arm to and between said open and closed positions;
an aligner for positioning said upper platen parallel to said lower platen as said upper platen approaches said closed position;
wherein said aligner carries an adjuster for varying the closed position distance between said upper and lower platens; and
an overcenter lever mechanism comprising a handle, the handle pivotally mounted about a second axis parallel to said first pivot axis, and said overcenter mechanism extending between said second axis and said adjuster.

4. The invention as defined in claim 3 wherein said aligner comprises a lever section supporting said support arm above said first pivot axis.

5. The invention as defined in claim 3 wherein said adjuster comprises a support rod, a carrier on said support arm engaging the support rod, and a connector securing the upper platen to the support rod.

6. The invention as defined in claim 5 wherein the carrier comprises a threaded bore in said support arm.

7. The invention as defined in claim 6 wherein said support rod is correspondingly threaded for mating with said bore, and carries a rotary handle.

8. The invention as defined in claim 5 wherein said connector comprises a swivel coupling.

9. A heat applied transfer press comprising:
an upper platen;
a lower platen and a base supporting the upper platen, at least one of said upper and lower platens having a heating element;
a support arm pivotally coupled to the base about a first pivot axis and carrying the upper platen to and between an open position spaced apart from the lower platen and closed position closely adjacent the lower platen;
an operator for manually displacing said support arm to and between said open and closed positions;
an adjuster carried by said support arm for varying the closed position distance between said upper and lower platens.
wherein said operator comprises an overcenter lever mechanism comprising a handle pivotally mounted about a second axis parallel to said first pivot axis; and
wherein said base comprises a support wall and said second pivot axis is carried by said support wall above said first pivot axis.

10. A heat applied transfer press comprising:
an upper platen;
a lower platen and a base supporting the upper platen, at least one of said upper and lower platens having a heating element;
a support arm pivotally coupled to the base about a first pivot axis and carrying the upper platen to and between an open position spaced apart from the lower platen and closed position closely adjacent the lower platen;
an operator for manually displacing said support arm to and between said open and closed positions;
an adjuster carried by said support arm for varying the closed position distance between said upper and lower platens;
wherein said operator comprises an overcenter lever mechanism comprising a handle pivotally mounted about a second axis parallel to said first pivot axis;
wherein said base comprises a support wall and said second pivot axis is carried by said support wall above said first pivot axis; and
wherein said support wall is inclined toward said platens.

* * * * *